United States Patent [19]
Fujino et al.

[11] 3,741,982
[45] June 26, 1973

[54] NOVEL BASIC, CATIONIC DYESTUFF

[75] Inventors: Sadao Fujino, Fukuoka-ken; Yoshio Magara, Kitakyushu, both of Japan

[73] Assignee: Mitsubishi Chemical Industries, Limited, Tokyo, Japan

[22] Filed: Aug. 26, 1970

[21] Appl. No.: 67,250

[30] Foreign Application Priority Data
Sept. 3, 1969  Japan.............................. 44/69903
Jan. 20, 1970  Japan.............................. 45/52031
Feb. 6, 1970   Japan.............................. 45/10468

[52] U.S. Cl............ 260/326.15, 8/177 R, 8/178 R, 8/179, 106/176, 260/141, 260/165, 260/240 G
[51] Int. Cl............................................. C07d 27/38
[58] Field of Search.................. 8/177 AB; 260/326.11, 240 G, 566 B, 326.15

[56] References Cited
UNITED STATES PATENTS
3,331,831  7/1967  Raue et al............................ 260/162
3,345,355  10/1967 Raue et al............................ 260/165

FOREIGN PATENTS OR APPLICATIONS
570,686  2/1959  Belgium

OTHER PUBLICATIONS
Grammaticakis, Comptes Rendus, vol. 226, pp. 189-1-91 (1948).

Smith, The Chemistry of Open-Chain Organic Nitrogen Compounds, Vol. II, pp. 40 and 171-172 (W.A. Benjamin, Inc. N.Y.), published 1966.

Primary Examiner—John D. Randolph
Attorney—Oblon, Fisher and Spivak

[57] ABSTRACT

A novel dyestuff having the general formula

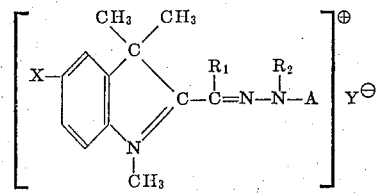

(wherein $R^1$ represents an alkyl or an acyl group, $R^2$ represents hydrogen, an alkyl or an aryl group, X represents hydrogen or halogen atom or an alkyl or an alkoxy group, A represents benzene or naphthalene nucleus which may contain one or more substituents of an alkyl, an alkoxy, nitro amino, substituted amino, or phenoxy group or halogen atom and Y represents an anion) and which dyestuff can dye polyacrylonitrile and cellulose acetate fiber with excellent fastness to light and heat.

2 Claims, No Drawings

NOVEL BASIC, CATIONIC DYESTUFF

The present invention relates to a novel basic dyestuff, to a process for producing the dysestuff and to a process for dyeing a synthetic fiber using the dyestuff.

The dyestuff according to the present invention is a diazamethine cationic dyestuff and it can be used to dye a synthetic fiber, especially acrylic and cellulose acetate fiber in yellow to orange shade with good fastness, especially to light and to heat. The dyestuff is shown by general formula I

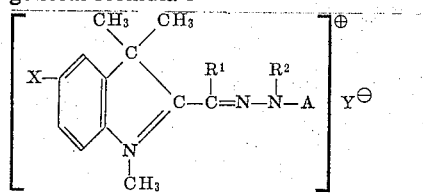

(wherein $R^1$ represents an alkyl or an acyl group, $R^2$ represents hydrogen, an alkyl or an aryl group, X represents hydrogen or halogen atom or an alkyl or an alkoxy group, A represents benzene or naphthalene nucleus which may contain one or more substituents of an alkyl, an alkoxy, nitro amino, substituted amino, or phenoxy group or halogen atom and Y represents an anion).

The examples of alkyl group represented by $R^1$ in the above formula include lower alkyl such as methyl, ethyl and propyl group and the example of acyl group represented by $R^1$ includes acetyl group. The examples of alkyl and aryl group represented by $R^2$ include lower alkyl group, such as methyl, ethyl, propyl and butyl group, substituted lower alkyl group, wherein said substituents are one or more substituents selected from the group of halogen, cyane, carbomoyl,hydroxyl,phenyl, lower alkyl,substituted amino,and alkoxy, such as cyanoethyl, carbamoylethyl, chloroethyl, oxyethyl, dioxypropyl, methoxyethyl, ethoxyethyl, $\gamma$-chloro-$\beta$-hydroxy propyl, $\gamma$-methoxy-$\beta$-hydroxy propyl, $\beta$-dimethyl aminoethyl and $\beta$-diethyl aminoethyl, and aryl group such as benzyl group. The examples of the member X include hydrogen atom, a lower alkyl group, such as methyl, ethyl, and propyl group, a lower alkoxy group, such as methoxy, and ethoxy group, nitro group and a halogen atom, such as chlorine and bromine. The member A is a benzene or naphthalene nucleus and may contain one or more of substituents of a lower alkyl group, such as methyl and ethyl group, a lower alkoxy group, such as methoxy and ethoxy group, aryloxy group, such as phenoxy group, nitro group and halogen atom such as chlorine and bromine, alkoxycarbonyl group and amino group or substituted amino group wherein said substituents may be alkyl and acyl group. More particularly, the examples of the member A include phenyl, 2-tolyl, 4-tolyl, 2-ethyl phenyl, 4-ethyl phenyl, 2-methoxy phenyl, 2-ethoxy phenyl, 4-methoxy phenyl, 4-ethoxy phenyl, 2,4-dimethoxy phenyl, 2,5-dimethoxy phenyl, 4-phenoxy phenyl, 4-chlorophenyl, 4-nitrophenyl, 4Ethoxycarbonyl phenyl, 4-dimethylamino phenyl, 4-acetylamino phenyl, trimethyl phenyl, 2-chloro-4-methoxy phenyl, 3-chloro-4-methoxy phenyl, 1-naphthyl, 2-naphthyl, 7-methoxy-1-naphthyl, 4-methoxy-1-naphthyl, 5-nitro-1-naphthyl, 5-chloro-1-naphthyl, 5-bromo-1-naphthyl, 7-chloro-2-naphthyl and 7-bromo-2-naphthyl groups. The examples of anion Y include formate, acetate, oxalate, p-toluene sulfonate, sulfamate,N-substituted sulfamate, phosphate, alkali metal phospate, such as sodium phosphate halide, acidic phosphate of polyhydric alcohol, sulfate, alkyl sulfate, perchlorate, zinc halide such as zinc chloride and hydroxyl anions.

There are various ways of preparing the novel dyestuff represented by general formula I according to this invention, but it is conveniently prepared by either condensation of an oxime or a nitroso compound with a hydrazine or a salt thereof, or alkylation of an azo compound or of a hydrazone compound.

The details of such reactions are explained hereinafter.

CONDENSATION PROCESS

The dyestuff represented by general formula I is prepared by condensation of an oxime compound having general formula II

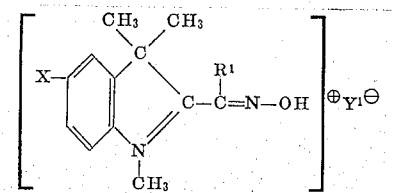

or a nitroso compound having general formula III

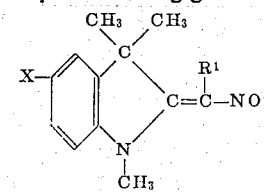

with a hydrazine compound having general formula IV

or a salt of hydrazine compound having general formula V

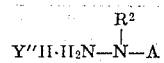

in the presence of an acid material, if necessary; in the above fomulae $R^1$, $R^2$, X and A have the same meanings as in the foregoing and $Y^1$ and $Y^2$ represent an anion, respectively.

The condensation reaction of such oxime or nitroso compound with such hydrazine compound or salt thereof is conveniently carried out in an amount of the hydrazine compound or salt thereof of stoichiometric or excess and the temperature at which the reaction is effected generally ranges from 0° to 150°C and preferably from room temperature to 100°C.

Although the condensation reaction can be carried out in the absence of any solvent, it is preferred to effect the reaction in the presence of a solvent or a diluent for either one or both reactants. Such solvents include an alcohol, such as methanol, ethanol, butanol, isopropanol, ethylene glycol, glycerol, polyethylene glycol, and thiodiethylene glycol; an ether, such as ethylcellosolve, diethylene glycol butyl ether, tetrahydrofuran and dioxane; bis-oxyethyl sulfone, dimethyl sulfoxide, formamide, dimethyl formamide, diethyl formamide, tetramethylene sulfone, hexamethyl phosformamide, $\alpha$- or $\beta$- alkoxy alkyl nitrile, water and a mixture thereof, and such diluents include benzene, ethylacetate and tetrachloroethane.

Further, the condensation reaction can be accelerated by removing hydroxylamine formed during the reaction from the system, for example, applying vacuum conditions to the reaction mass, such as a vacuum of 70mmHg at a temperature over 60°C.

It is also preferred to add to the system either a basic substance, such as triethyl amine, pyridine and piperidine or an acid substance, such as hydrochloric, acetic and phosphoric acid in addition to such solvent or diluent, in order to effect the reaction. Especially, in case of the condensation of such nitroso compound and hydrazine compound, there is necessary to add such acid substance.

After completion of the condensation, there are various ways to recover the resulting dyestuff from the reaction system. In case the solvent is employed, (1) the solvent is distilled out to recover the dyestuff, or (2) the mixture is allowed to cool to precipitate the dyestuff. Alternatively, the reaction mixture is diluted with water and, then, (3) the dyestuff is salted out by addition of a salt, or (4) zinc chloride is added to form a water-insoluble double salt. The dyestuff or the double salt thereof separated is filtered out and, if necessary, washed with a non-polar solvent, such as benzene and toluene, to remove unreacted hydrazine and salt thereof.

The oxime compound employed in the condensation reaction can be prepared by treating a 2-methylene indoline compound having general formula VI with nitrous acid:

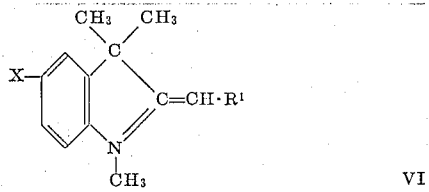

VI (wherein X and $R^1$ have the same meanings as in formula I), the process itself being well-known. The examples of said oxim compound include 1,3,3-trimethyl-2-methyl oximinomethyl indoleninium chloride, 1,3,3-trimethyl-2-methyl oximinomethyl-5-chloro indoleninium clhoride, 1,3,3-trimethyl-2-methyl oximinomethyl-5-methyl indoleninium chloride, 1,3,3-trimethyl-2-methyl oximinomethyl-5-methoxy indoleninium chloride, 1,3,3-trimethyl-2-oximinomethyl-5-butyl indoleninium chloride, 1,3,3-trimethyl-2-(methyl oximinomethyl) indoleninium chloride, 1,3,3-trimethyl-2-(acetyl methyl oximino-methyl) indoleninium chloride and 1,3,3-trimethyl-2-methyl oximinomethyl-5-nitro indoleninium phosphate.

The nitroso compound having general formula (III) is prepared by bringing an aqueous solution of the oxime compound having general formula (II) into alkaline condition and separating the precipitate thus formed. The examples of such nitroso compound include 1,3,3-trimethyl-2-nitrosomethylene indoline, 1,3,3-trimethyl-2-nitrosomethylene-5-chloro indoline, 1,3,3-trimethyl-2-nitrosomethylene-5-methoxy indoline, 1,3,3-trimethyl-2-nitrosomethylene-5-methyl indoline 1,3,3-trimethyl-2-(methyl-nitrosomethylene) indoline.

The examples of the hydrazine compound having general formula IV include N-phenyl hydrazine, N-(4-methyl) phenyl hydrazine, N-(4-methoxy)-phenyl hydrazine, N-phenyl-N-methyl hydrazine, N-(4-chloro)-phenyl-N-methyl hydrazine, N-phenyl-N-ethyl hydrazine, N-phenyl-N-cyanoethyl hydrazine, N-phenyl-N-chloroethyl hydrazine, N-phenyl-N-($\beta$, $\gamma$-dihydroxy)butyl hydrazine, N-(4-methyl) phenyl-N-methyl hydrazine, N-(4-methyl) phenyl-N-ethyl hydrazine, N-(4-methoxy) phenyl-N-methyl hydrazine, N-(4-ethoxy)phenyl-N-methyl hydrazine, N-(4-phenoxy) phenyl-N-methyl hydrazine, N-(3-chloro-4-methoxy)phenyl-N-methyl hydrazine, N-(4-ethoxycarbonyl)phenyl-N-methyl hydrazine, N-(4-dimethylamino)phenyl-N-methyl hydrazine, N-(4-acetylamino) phenyl-N-methyl hydrazine, N-(4-methoxy)-phenyl-N-ethyl hydrazine, N-(4-ethoxy)-phenyl-N-ethyl hydrazine, N-(2,4,6-trimethyl)-phenyl-N-methyl hydrazine, N-(2,4-dimethoxy) phenyl-N-methyl hydrazine, N-(4-chloro)-phenyl-N-methyl hydrazine, N-(4-nitro)phenyl-N-methyl hydrazine, N-$\beta$-naphthyl-N-methyl hydrazine, N-(4-dimethylamino)$\beta$-naphthyl hydrazine, N-$\beta$-naphthyl-N-ethyl hydrazine, N-benzyl-N-phenyl hydrazine, N-($\beta$-dimethylamino)-ethyl-N-phenyl hydrazine, N-($\beta$-diethyl amino) ethyl-N-phenyl hydrazine and N-$\alpha$-naphthyl-N-methyl hydrazine.

Alkylation of an azo and a hydrazone compounds

Alternatively, the dyestuff having general formula I according to this invention can be prepared by alkylation reaction of an azo compound having general formula VII

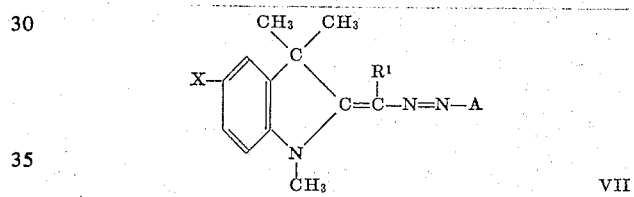

VII or a hydrazone compound having general formula VIII

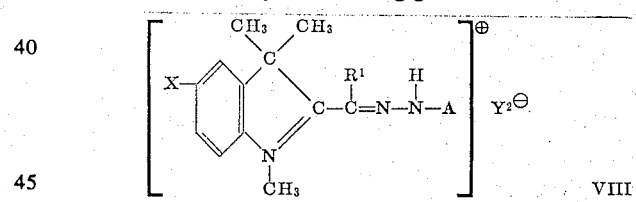

VIII (in the above formulae $R^1$, A and X have the same meanings in general formula I and $Y^2$ represents an anion).

The azo compound and hydrazone compound employed as raw material for the production of the dyestuff according to this invention can be prepared by the coupling reaction of 2-methylene indoline compound having general formula VI above mentioned or a compound having general formula IX

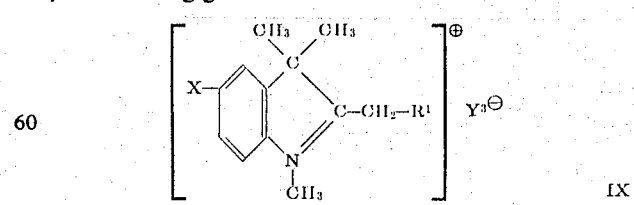

IX with a diazo compound of an aromatic amine which may contain one or more of nonionic substituents. (wherein $R^1$ and X have the same meanings in formula I and $Y^3$ represents an anion). This coupling reaction is conveniently carried out at a temperature of from -5° to 30°C, preferably 0° to 15°C and under a pH condition ranging between 2 and 7, preferably 3.5 and 5. In the coupling reaction a water-soluble organic solvent, for example, an organic acid including formic acid and acetic acid, a lower aliphatic alcohol including methanol and ethanol, acetone and dimethyl formamide can be present, if desired.

The reaction product comprises mainly the hydrazone compound represented by general formula VIII where reaction condition is acidic and mainly the azo compound represented by general formula VII where the condition is alkaline.

The dyestuff according to this invention is obtained by reacting the azo and hydrazone compounds, dissolved in a solvent or diluted with a diluent with an alkylating agent at a temperature of from room temperature to 150°C. The examples of said alkylating agent include, for example, a dialkyl sulfate, such as dimethyl sulfate and diethyl sulfate, an alkyl halide, such as methyl iodide, ethyl iodide, methyl bromide and ethyl bromide, and an alkyl p-toluene sulfonate, such as methyl p-toluene sulfonate and ethyl p-toluene sulfonate. The amount of such alkylating agent is stoichiometric or more. In the latter case, an amount in excess of the stoichiometric amount acts as a diluent.

The examples of such solvent and diluent include methanol, ethanol, benzene, toluene, xylene, chlorobenzene, nitrobenzene, acetone, dimethyl formamide, chloroform and carbon tetrachloride.

In the alkylation reaction, if desired, a deacidifying agent, such as magnesium oxide can be present in the system.

The anions represented by $Y^1$, $Y^2$ and $Y^3$ are selected depending upon the reagents employed in such diazotization, coupling, alkylation and post treatment; for practical purposes they are selected from the anions mentioned above in connection with the condensation process.

The reaction mixture containing the object dyestuff is subjected to after treatment, that is salting out or double salt forming treatment as in the case where the oxime or nitroso compound is reacted with the hydrazine compound or the salt thereof to obtain the dyestuff.

The dyestuff obtained from both processes can be purified by dissolving it in hot water, contacting with an absorbent, such as active carbon, filtering out and precipitating again and recovering the dyestuff.

The dyestuff according to this invention is a basic dyestuff and is readily soluble in warm water and an aqueous acid solution. Thus, the dyestuff can dye various synthetic fibers, especially polyacrylonitrile, polyester and cellulose acetate fibers in neutral to acid dyebath and with printing paste. Such synthetic fibers include also a blend and a mixed fabric of such synthetic fiber and other fiber, such as cotton, viscose rayon, wool, polyester ether and polyamide.

In dyeing, the fiber is treated in dyebath under neutral to slight acid condition containing the dyestuff according to this invention at a temperature of from room temperature to 100°C, preferably 80° to 100°C, the temperature at which dyeing process is effected, of course, varies depending upon the sort of synthetic fiber to be dyed and the presence or absence of an assistant. Where the dyeing is carried out under pressurized conditions a dyeing temperature over 100°C can be successfully employed. In the operation, any known dyeing assistant, such as an organic and inorganic acid, a salt thereof, a carrier, a retardant or leveling agent and an organic solvent can be used.

In printing, printing paste is prepared from the dyestuff, a thickener, a dissolving assistant, an accelerator, a carrier, a stabilizer and an antireducing agent and the fiber is printed with such paste and heat treated to effect the fixation of dyestuff to the fiber.

The dyed material obtained as above is in brilliant yellow to orange shade and possesses good fastness, especially to light, to heat and to potting.

Dyestuffs similar to those of this invention have been suggested. All of such known dyestuffs contain a carbon atom which is attached to 2-position carbon in indoline nucleus is linked to hydrogen atom and nitrogen atom of the residue of hydrazine, whereas in the dyestuff according to this invention such carbon atom attached to 2-position carbon in indoline nucleus is linked to a lower alkyl group (in general formula the member of $R^1$) and nitrogen atom of the residue of hydrazine. This difference accounts for the superior fastness of the dyestuff according to this invention to that of prior art as shown in following Table 1.

TABLE 1

| Formula | Fastness to light | |
|---|---|---|
| | 0.2% o.w.f. | 1% o.w.f. |
| Dyestuff of this invention: [structure shown with indoline nucleus bearing two CH$_3$ groups on C, N–CH$_3$, linked via C–C(CH$_3$)(CH$_3$)=N–N–phenyl, with Cl$^\ominus$ counterion] | 4~5 | 6 |

TABLE 1—Continued

| Formula | Fastness to light | |
|---|---|---|
| | 0.2% o.w.f. | 1% o.w.f. |
| [structure: 1,3,3-trimethylindolenine-C(CH₃)=C-N=N(OH)-C₆H₄-CH₃]⁺ Cl⁻ | 6 | 6 |
| [structure: 1,3,3-trimethylindolenine-C(CH₃)=C-N(CH₃)-N-C₆H₄-OCH₃]⁺ Cl⁻ | 6 | 6 |
| Prior dyestuff: | | |
| [structure: 1,3,3-trimethylindolenine-N=CH-N(CH₃)-N-C₆H₅]⁺ Cl⁻ | 3~4 | 5~6 |
| [structure: 1,3,3-trimethylindolenine-C-CH=N-N(CH₃)-C₆H₄-CH₃]⁺ Cl⁻ | 5 | 5~6 |
| [structure: 1,3,3-trimethylindolenine-C-CH=N-N(CH₃)-C₆H₄-OCH₃]⁺ Cl⁻ | 5~6 | 6 |

NOTE.—The fastness to light is determined according to the specification of the Japanese Industrial Standard (JIS) L-1044 using the Carbon Arc method.

As appearent from the Table, the dyestuff according to this invention is superior to that of the prior art, in fastness to light, especially in light color.

This invention will be explained in more detail referring to the following Examples. It should be understood, however, that this invention is not restricted by the Examples. In the Examples "part" and "percentage" are expressed by weight and the absorption maximum ($\lambda$max.) is as measured in methanol solution containing 0.1 percent of acetic acid.

EXAMPLE 1.

1,3,3-Trimethyl-2-(methyl-oximinomethyl) indoleninium chloride (2.8 parts) and N-phenyl-N-methyl hydrazine (1.5 parts) were mixed and dissolved in tetramethylene sulfone (20 parts) at 100°C and the solution was stirred at that temperature for 8 hours to effect the condensation reaction. After completion of the reaction, the reaction mixture was diluted with warm water of 60°C (20 parts) and concentrated hydrochloric acid (5 parts), and, after allowing to cool to 20°C, the solution was salted out by addition of sodium chloride (20 parts) and zinc chloride (5 parts) to separate the cyrstals of yellowish orange, which were then filtered out. A dyestuff having the following formula and $\lambda$ max. of 433 m$\mu$ was obtained:

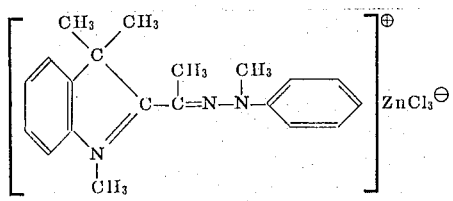

This dyestuff was admixed with a mixture of sulfamic acid (2 parts) and boric acid (70 parts) in such amount that the resulted dyestuff composition gave a dye concentration on dyed fabric the same as that of C.I. basic yellow 11. The dyestuff composition (0.2 part) was dissolved in hot water (10 parts) and diluted with water (500 parts), then acetic acid (0.1 part), sodium acetate (0.15 parts) and a nonionic surfactant (0.15 parts) were added to the solution to prepare a dyebath. Polyacrylonitrile fiber (20 parts) was immersed in the bath the temperature of which was then raised to 90°C over 40 minutes and dyeing was effected at that temperature for 1 hour. The dyed fiber was washed with water, treated in a soaping bath (500 parts) containing 0.5 percent of a detergent at 80° to 90°C for 10 minutes, washed again with water and dried. A polyacrylonitrile fiber having uniform and brillant greenish yellow shade with excellent fastness to light was obtained.

Cellulose acetate fiber (20 parts) was dyed as in the case of polyacrylonitrile fiber to obtain dyed fiber having uniform and brilliant greenish yellow shade.

Basacryl salt A N (available from Badische Anilin & Soda Fabrik A.G.) (0.4 parts) and Levegal PAN (available from Farbenfabriken Bayer A.G.) (1.0 part), were added to the dyebath in the same was as mentioned above and the same dyeing procedures were repeated to obtain a dyed material having uniform and brilliant greenish yellow shade.

EXAMPLE 2.

1,3,3-Trimethyl-2-(acetyl-oximinomethyl) indoleninium chloride (2.8 parts) and N-(4-methyl)-phenyl-N-methyl hydrazine (1.5 parts) were employed and processed them according to the procedures in Example 1 to obtain a dyestuff having the formula:

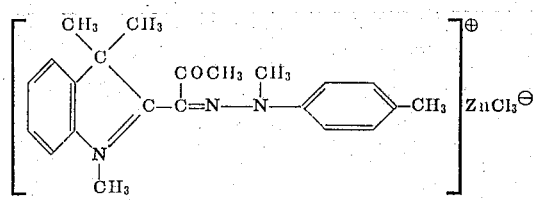

This dyestuff could dye polyacrylonitrile fiber in greenish yellow shade. Examples 3 to 26.

Various oximino compounds and various hydrazine compunds in equimolar ratio were dissolved in tetramethylene sulfone at 100°C and continued agitation for 8 hours. After completion of the reaction, the reaction mixture was diluted with warm water and hydrochloric acid, allowed to cool to 20°C and salted out with salt to recover dyestuff thus obtained.

The reactants, λ max. of dyestuff and shade on polyacrylonitrile are given in Table 2.

TABLE 2

| Example | Oximino | Hydrazine | Shade | λ max. |
|---|---|---|---|---|
| 3 | ![indoleninium with C=NOH, Cl⁻] | H₂N—N(CH₃)—C₆H₄—OCH₃ | Reddish bellow | 452 |
| 4 | Same as above | H₂N—N(CH₃)—C₆H₄—Cl | Yellow | 435 |
| 5 | do | H₂N—N(CH₃)—C₆H₄—CH₃ | do | 442 |
| 6 | do | H₂N—N(CH₃)—C₆H₄—OC₂H₅ | Reddish bellow | 455 |
| 7 | do | H₂N—N(CH₃)—C₆H₄—OCH₃ | do | 453 |
| 8 | do | H₂N—N(CH₃)—C₆H₃(Cl)—OCH₃ | do | 460 |

TABLE 2—Continued
| Example | Oximino | Hydrazine | Shade | λ max. |
|---|---|---|---|---|
| 9 | do | 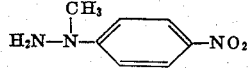 | Greenish yellow | 430 |
| 10 | do | 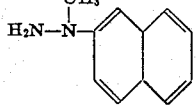 | Reddish yellow | 457 |
| 11 | do | 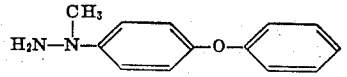 | Yellow | 445 |
| 12 | do | 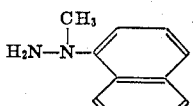 | Greenish yellow | 420 |
| 13 | do | 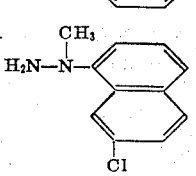 | Reddish yellow | 458 |
| 14 | do | 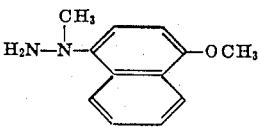 | ....do.... | 454 |
| 15 | do | 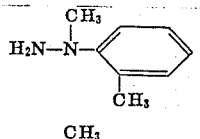 | Greenish-yellow | 435 |
| 16 | do | 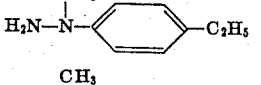 | Yellow | 440 |
| 17 | 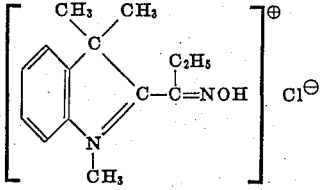 |  | Reddish-yellow | 454 |
| 18 | 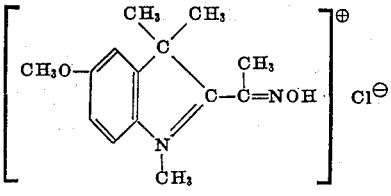 | Same as above | do | 452 |
| 19 | 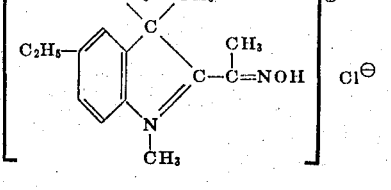 | 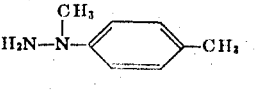 | Greenish-yellow | 433 |

TABLE 2—Continued

| Example | Oximino | Hydrazine | Shade | λ max. |
|---|---|---|---|---|
| 20 | (1,3,3,3,7-pentamethyl-2-(hydroxyimino-ethyl)indolinium chloride structure) | $H_2N-NH-C_6H_3(CH_3)-CH_3$ (4-methylphenylhydrazine with N-methyl) | Yellow | 447 |
| 21 | (5-chloro-1,3,3-trimethyl-2-(hydroxyimino-ethyl)indolinium chloride structure) | Same as above | do | 448 |
| 22 | (1,3,3-trimethyl-2-(hydroxyimino-ethyl)indolinium chloride structure) | $H_2N-N(CH_2-C_6H_5)(C_6H_5)$ | do | 432 |
| 23 | Same as above | $H_2N-NH-C_6H_4-OCH_3$ | Yellowish orange | 460 |
| 24 | do | $N_2H-N(CH_2CH_2N(CH_3)_2)-C_6H_4-OCH_3$ | Reddish yellow | 454 |
| 25 | do | $H_2N-N(CH_2CH_2OCH_3)-C_6H_5$ | Greenish yellow | 425 |
| 26 | do | $H_2N-N(C_2H_4CONH_2)-C_{10}H_7$ (naphthyl) | Reddish yellow | 455 |

EXAMPLE 27.

A solution of p-anisidine (1.3 parts) in a mixture of 35 percent hydrochloric acid (3.0 parts) and water (30 parts) was cooled and 9.3 percent aqueous sodium nitrite solution (7.5 parts) was added to the solution to effect diazotization. The resulting mixture was added to a solution of 1,3,3-trimethyl-2-ethylidene indoline (2.0 parts) in a mixture of 35 percent hydrochloric acid (1.2 parts) and water (20 parts) while cooling, and the pH value was adjusted to 3.5 – 4.0 by means of an aqueous sodium acetate solution to effect the coupling reaction. Upon completion of the coupling, the resultant solution was brought to alkaline by addition of aqueous sodium hydroxide solution and the azo compound thus precipitated was filtered out.

Into a solution of the azo compound (1.5 parts) in dimethyl formamide (3 parts) was added magnesium oxide (0.5 part) and then dimethyl sulfate (4 parts) at 95° to 100°C, and methylation was carried out at that temperature for 3 hours. Then, the reaction mixture was poured into warm water (100 parts), contacted with active carbon and filtered out. The dyestuff in the filtrate was salted out by addition of sodium chloride (15 parts), filtered out and dried at 40° – 50°C. A novel dyestuff (1 part) having the following formula and being λ max. = 452 mμ was obtained.

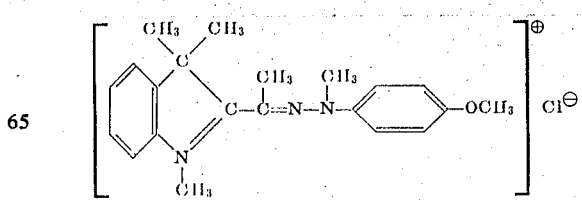

A reddish yellow shade of excellent fastness to light and to heat was obtained when the above dyestuff was applied to polyacrylonitrile fiber.

EXAMPLE 28

A solution of aniline (0.9 part) in a mixture of 35 percent hydrochloric acid (2.5 parts) and water (20 parts) was cooled and diazotized by addition of 9.3 percent aqueous sodium nitrite solution (5.7 parts). The resulting mixture was added to a solution of 1,3,3-trimethyl-2-ethylidene indoline (2.0 parts) in ethanol (15 parts) and the pH value of the system was adjusted to 3.5 – 4.0 by means of aqueous sodium acetate solution to effect coupling reaction. After completion of the coupling, the reaction system was diluted with water (300 parts) thereby a salt of hydrozone compound (1.2 parts) was recovered by filtering out, washing with water and drying at 50°C.

This salt was mixed with dimethyl sulfate (6.0 parts) and stirred at 90° – 100°C for 12 hours to effect methylation. After completion of the reaction, the resulting mixture was poured into water (300 parts) followed by stirring at 60°C for 1 hour and filtering out. A crude dyestuff was separated from the filtrate by salting out by addition of sodium chloride (20 parts) and filtering out. The crude dyestuff was dissolved in water (300 parts) and the aqueous solution was repeatedly washed with chlorobenzene (30 parts each) to remove unreacted raw materials from the crude dyestuff. Then the dyestuff dissolved in the aqueous layer was salted out by addition of sodium chloride (10 parts) and zinc chloride (2 parts), filtered out and dried.

A dyestuff of the following formula and having λmax. of 433 mμ was obtained:

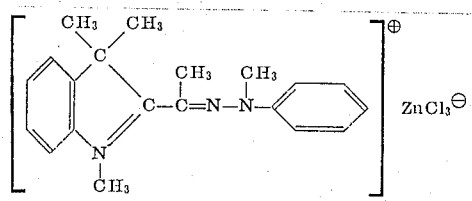

A greenish yellow shade of excellent fastness to light and to heat was obtained when the dyestuff was applied to polyacrylonitrile fiber.

EXAMPLE 29

A solution of p-chloroaniline (1.3 parts) in a mixture of 35 percent hydrochloric acid (3.3 parts) and water (50 parts) was cooled and then 7.8 percent aqueous sodium nitrite solution (10.9 parts) was added to the solution to carry out diazotization, followed by decomposing an excess of sodium nitrite by means of sulfamic acid.

The resulting mixture was added to a solution of 1,3,3-trimethyl-2-ethylidene indoline (2 parts) in a mixture of acetic acid (5 parts) and water (10 parts) while being cooled, and the pH value of the system was adjusted to 3.5 – 4.0 by addition of aqueous sodium acetate solution to effect coupling reaction. After completion of the coupling, the solution was brought to alkaline by addition of 28 percent aqueous ammonia and the azo compound precipitated was filtered out and dried.

This azo compound (1.3 parts), methanol (10 parts) and methyl bromide (2.0 parts) were charged in an autoclave and methylation was carried out at 80°C for 3 hours. After completion of the reaction, the reaction mass was poured into water (100 parts) and, then 4 percent aqueous sodium hydroxide solution (40 parts) was added to the solution and the mixture was stirred at a room temperature for 1 hour, thereby the precipitate thus formed was filtered out. The resulting wet cake was admixed with sulfamic acid (2.0 parts) and dried. The product was a dyestuff having the following formula and λ max. of 435 mμ.

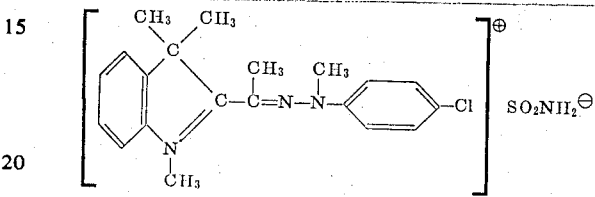

A yellow shade of excellent fastness to light and heat was obtained when the dyestuff was applied to polyacrylonitrile fiber.

In the procedures above-mentioned, the sulfamic acid was replaced by oxalic acid to obtain a dyestuff as oxalate.

EXAMPLE 30 p-Anisidine (1.3 parts) and 1,3,3-trimethyl-2-ethylidene indoline (2.0 parts) were employed and the procedures in Example 27 were repeated to obtain an azo compound.

A solution of the azo compound (1 part) in toluene (5 parts) was admixed with dimethyl sulfate (4 parts), the mixture was heated at 95° – 100°C for 15 hours under agitation to carry out methylation. The reaction mass was poured into warm water, then the dyestuff dissolved in an aqueous phase recovered was salted out by addition of sodium chloride, filtered out and dried at 50°C.

The resulting dyestuff was substantially the same as that prepared in Example 27.

EXAMPLES 31 – 41

Azo compounds were prepared according to the procedures in Example 27 except that the aromatic amines given in the following Table were diazotized and coupled with 1,3,3-trimethyl-2-ethylidene indoline.

Magnesium oxide (0.5 part) was added to a solution of each of the azo compounds (1.5 parts) in dimethyl formamide (3 parts), the resulting mixture was admixed with diemthyl sulfate (4.0 parts) at 95° – 100°C and methylation was carried out at that temperature for 3 hours under agitation.

After completion of the reaction, the reaction mass was poured into warm water (100 parts), and the mixture was contacted with active carbon while still warm and filtered out. The dyestuff presented in the filtrate was salted out by addition of sodium chloride and filtered out.

The crude dyestuff so obtained was dissolved in water (100 parts) and chlorobenzene (20 parts) was added to the solution while being stirred, thereby unreacted raw materials were brought into the chlorobenzene. The dyestuff dissolved in the aqueous phase recovered was salted out by addition of sodium chloride (15 parts). The dyestuffs given in the Table as determined by means of thin layer chromatography were obtained.
TABLE 3
| Example | Amine | Dyestuff | Shade | λ max. (mμ) |
|---|---|---|---|---|
| 31 | 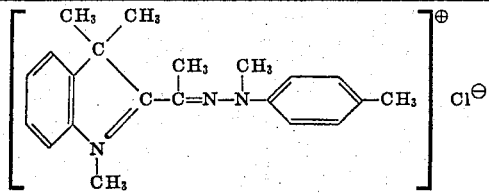 | 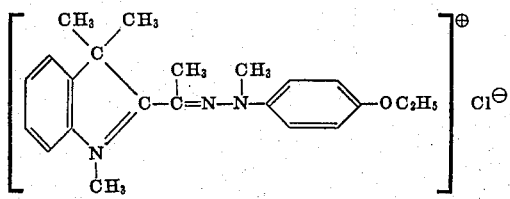 | Yellow | 442 |
| 32 | | | Reddish yellow. | 455 |
| 33 | | | ...do... | 453 |
| 34 | | | Yellow | 445 |
| 35 | | | ...do... | 450 |
| 36 | | | Greenish yellow. | 430 |
| 37 | | | Reddish yellow. | 456 |
| 38 | | | Greenish yellow. | 420 |

TABLE 3 — Continued

| Example | Amine | Dyestuff | Shade | λ max. (mμ) |
|---|---|---|---|---|
| 39 | H₂N—[naphthyl]—Cl | [indoline-azo-chloronaphthyl cation] Cl⁻ | Reddish yellow. | 458 |
| 40 | H₂N—[naphthyl]—OCH₃ | [indoline-azo-methoxynaphthyl cation] Cl⁻ | Yellow | 432 |
| 41 | H₂N—[tolyl with CH₃] | [indoline-azo-phenyl cation] Cl⁻ | Greenish yellow. | 456 |

The dyestuffs can dye polyacrylonitrile fiber in the shades given in the Table with excellent fastness to light and to heat. Example 42.

Following the precedures in Example 27 but p-ethylaniline (1.2 parts) was diazotized and coupled with 1,3,3-trimethyl-2-ethylidene indoline (2.0 parts) to prepare an azo compound.

The azo compound was subjected to methylation in an excess amount of methyl p-toluene sulfonate at 100°C for 4 hours under agitation. After completion of the reaction, the reaction mass was poured into warm water of 60°C (200 parts), the mixture was stirred at that temperature for 2 hours and allowed to stand and to cool; then the dyestuff in the aqueous phase recovered was salted out by addition of sodium chloride (10 parts) and zinc chloride (5 parts), filtered out and dried at 50° – 55°C.

The dyestuff thus obtained has the following formula and λmax. of 440 mμ.

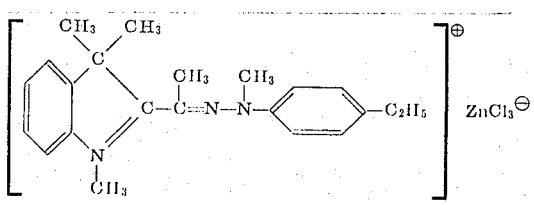

A yellow shade having excellent fastness to light and to heat was obtained when the dyestuff was applied to polyacrylonitrile fiber.

The procedures above-mentioned were repeated except that ethyl p-toluene sulfonate and propyl p-toluene sulfonate were employed as methylating agent, respectively.

The dyestuffs of the following formulae were obtained:

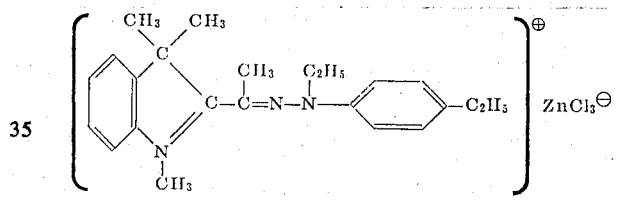

and

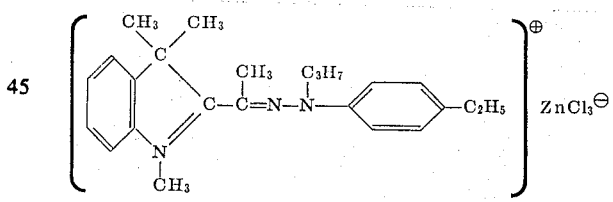

A yellow shade having excellent fastness to light and heat was obtained when polyacrylonitrile was dyed with each dyestuff.

EXAMPLES 43 – 47

Following the procedures in Example 27, various diazo compounds were obtained by diazotizing various aromatic amines and coupling with various indoline compounds, the raw materials and the products being given in the following Table. Then each diazo compounds was methylated with dimethyl sulfate in dimethyl formamide and salted out by means of sodium chloride and zinc chloride to obtain the various dyestuffs given in the Table 4.

These dyestuffs can dye polyacrylonitrile in the shades given in the Table and have excellent fastness to light and to heat.

TABLE 4

| Example | Amine | Indoline | Dyestuff | Shade | λ max. (mμ) |
|---|---|---|---|---|---|
| 43 | H₂N—⟨⟩—OCH₃ | (structure) | (structure) ZnCl₃⁻ | Reddish yellow | 454 |
| 44 | H₂N—⟨⟩—OCH₃ | (structure) | (structure) ZnCl₃⁻ | do | 452 |
| 45 | H₂N—⟨⟩ | (structure) | (structure) ZnCl₃⁻ | Greenish yellow | 433 |
| 46 | H₂N—⟨⟩—CH₃ | (structure) | (structure) ZnCl₃⁻ | Yellow | 447 |
| 47 | H₂N—⟨⟩—CH₃ | (structure) | (structure) ZnCl₃⁻ | do | — |

EXAMPLE 48

A Yuzen paste (70 parts) comprising rice powder and sodium chloride in a concentration of 40 percent and a paste (30 parts) comprising gum napheacrys in a concentration of 33.3 percent were mixed to prepare a thickener.

The dyestuff (0.3 part) prepared according to Example 44, ethylene glycol (1.5 parts), 30 percent acetic acid (2 parts) and 50 percent tartaric acid (1 part) were dissolved in a suitable amount of warm water, then the solution and the thickener (60 parts) were mixed thoroughly and 50 percent resorcive (4 parts) was added to the mixture to prepare 100 parts of a printing paste.

Polyacrylonitrile fabric was printed with the printing paste, dried at 50°C and steamed at 100°C for 30 minutes. Then, the printed fabric was washed with water, soaped at 70°C for 20 minutes, washed with water again and dried. The printed fabric was a brillant reddish yellow and had excellent fastness to light.

Following Table 5 lists a number of further dyestaffs prepared according to this invention, λmax. thereof and shade when the dyestuffs are applied onto polyacrylonitrile fiber.

TABLE 5

| Structure | Shade | λ max. (mμ) |
|---|---|---|
|  | Yellow | 435 |
| 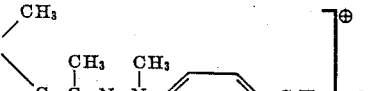 | do | 440 |
| 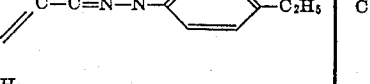 | Reddish yellow | 460 |
| 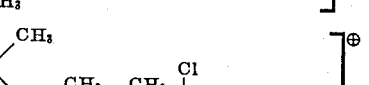 | do | 457 |
| 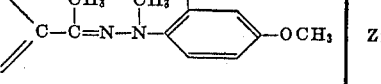 | Yellow | 448 |
|  | do | 432 |
| 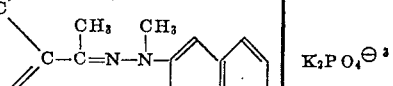 | do | 452 |

TABLE 5—Continued

| | Shade | λ max. (mμ) |
|---|---|---|
| [structure with C₂H₅, CH₃ groups, ZnCl₃⁻] | ...do... | 45 |
| [structure with CH₃ groups, ZnCl₃⁻] | Greenish yellow | 435 |

[1] Dyestuff 1 is prepared by quaternarisation with dimethyl sulfate and salting out with sodium chloride.
[2] Dyestuff 2 is prepared by quaternarisation with p-toluene sulfonic acid and salting out with sodium chloride.
[3] Dyestuff 3 is recovered by salting out with sodium chloride and acid potassium phosphate.

What is claimed is:
1. A cationic dyestuff having the formula:

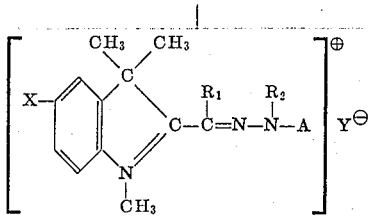

wherein $R^1$ represents a lower alkanoyl, $R^2$ represents hydrogen, a lower alkyl group selected from the group consisting of methyl, ethyl, propyl and butyl, a substituted lower alkyl group selected from the group consisting of cyanoethyl,carbamoylethyl,chloroethyl,oxyethyl,dioxypropyl, methoxyethyl,ethoxyethyl, γ-chloro-β-hydroxy propyl, γ-methoxy-β-hydroxy propyl, β-dimethyl aminoethyl and β-diethyl aminoethyl,or benzyl, X represents hydrogen, nitro,halogen,lower alkyl or lower alkoxy; A represents benzene or naphthalene,or benzene or naphthalene substituted with one or more substituents selected from the group consisting of lower alkyl, lower alkoxy,nitro, amino, substituted amino, phenoxy, and halogen; and Y represents an anion.

2. The dyestuff of claim 1, wherein the Y anion may be selected from the group consisting of formate,acetate, oxalate, p-toluene sulfonate,sulfamate,N-substituted sulfamate, phosphate,alkali metal phosphate,halide, acid phosphate of polyhydric alcohol, sulfate, alkyl sulfate, perchlorate,zinc halide, and hydroxyl.